United States Patent
Deng

(10) Patent No.: US 10,404,198 B2
(45) Date of Patent: Sep. 3, 2019

(54) CONTROLLING THE ENERGY FLOW FROM AN ELECTRICAL MACHINE WITH UNBALANCED IMPEDANCE

(71) Applicant: SIEMENS AKTIENGESELLSCHAFT, München (DE)

(72) Inventor: Heng Deng, Ikast (DK)

(73) Assignee: Siemens Aktiengesellschaft (DE)

(*) Notice: Subject to any disclaimer, the term of this patent is extended or adjusted under 35 U.S.C. 154(b) by 400 days.

(21) Appl. No.: 14/920,960

(22) Filed: Oct. 23, 2015

(65) Prior Publication Data
US 2016/0123305 A1    May 5, 2016

(30) Foreign Application Priority Data

Oct. 30, 2014 (EP) .................................. 14191070

(51) Int. Cl.
| | |
|---|---|
| *H02P 11/00* | (2006.01) |
| *H02P 9/00* | (2006.01) |
| *H02P 9/04* | (2006.01) |
| *H02P 25/22* | (2006.01) |
| *H02P 101/15* | (2016.01) |
| *F03D 7/02* | (2006.01) |

(52) U.S. Cl.
CPC .............. *H02P 9/006* (2013.01); *H02P 9/04* (2013.01); *F03D 7/0272* (2013.01); *H02P 25/22* (2013.01); *H02P 2101/15* (2015.01)

(58) Field of Classification Search
CPC ......... H02P 9/006; H02P 9/04; H02P 2101/15
See application file for complete search history.

(56) References Cited

U.S. PATENT DOCUMENTS

| | | | | |
|---|---|---|---|---|
| 1,935,439 | A | * | 11/1933 | Fallou ................. H02H 1/003 |
| | | | | 307/46 |
| 2006/0050759 | A1 | | 3/2006 | Sedighy |
| 2007/0182383 | A1 | | 8/2007 | Park et al. |
| 2013/0320936 | A1 | * | 12/2013 | Deng ....................... H02P 9/00 |
| | | | | 322/27 |

FOREIGN PATENT DOCUMENTS

| | | |
|---|---|---|
| CN | 103023059 A | 4/2013 |
| EP | 2546969 A1 | 1/2013 |
| WO | WO 2010114792 A1 | 10/2010 |

OTHER PUBLICATIONS

Zhou Yi et al.:"Operation of Grid-Connected DFIG Under Unbalanced Grid Voltage Condition"; IEEE Transactions on Energy Conversion; IEEE Service Center; US, vol. 24; No. 1; pp. 240-246; XP011250563; ISSN: 0885-8969; 2009.

(Continued)

*Primary Examiner* — Tulsidas C Patel
*Assistant Examiner* — Thomas K Quigley
(74) *Attorney, Agent, or Firm* — Schmeiser, Olsen & Watts LLP

(57) ABSTRACT

A method, an arrangement and a computer program for controlling an energy flow to a grid, from an electrical alternating current machine with unbalanced impedance, in particular an electrical alternating current generator of a wind turbine, the method comprising: obtaining a first power signal representing a first power command.

9 Claims, 4 Drawing Sheets

(56) References Cited

OTHER PUBLICATIONS

Wang Yi et al.: "Control of DFIG-based wind farms for network unbalance compensation"; Power Electronics Specialists Conference; IEEE; pp. 113-119; XP031299962; ISBN: 978-1-4244-1667-7; 2008.
Nasr-Azadani E. et al.:"Stability Analysis of Unbalanced Distribution Systems with Synchronous Machine and DFIG Based Distributed Generators"; IEEE Transactions on Smart Grid; USA; vol. 5; No. 5; pp. 2326-2338; XP011558486; ISSN: 1949-3053, DOI: 10.1109/TSG.2014.2321709; 2014.
Blaabjerg F. et al.:"Overview of Control and Grid Synchronization for Distributed Power Generation Systems"; IEEE Transactions on Industrial Electronics; vol. 53; No. 5; pp. 1398-1409; XP055160782; ISSN: 0278-0046; DOI:10.1109/TIE.2006.881997; 2006.
European Extended Search Report dated Jun. 19, 2015; Application No. 14191070.3; 11 pgs.
European Exam Report dated Jun. 15, 2018 for Application No. 14 191 070.3.
Mishra M K et al: "A Fast-Acting DG-Link Voltage Controller for Three-Phase DSTATCOM to Compensate AC and DC Loads", IEEE Transactions on Power Delivery, IEEE Service Center, New York, NY, US, vol. 24, No. 4, pp. 2291-2299, XP011276514, ISSN: 0885-8977, DOI: 10.1109/TPWRD.2009.2027501; 2009.
EP Communication pursuant to Article 94(3) EPC dated Jan. 23, 2019 for Application No. 14 191 070.3.

\* cited by examiner

Compensation Power/Current calculation regulation block opt. 1 regulation block opt. 2

CONTROLLING THE ENERGY FLOW FROM AN ELECTRICAL MACHINE WITH UNBALANCED IMPEDANCE

CROSS-REFERENCE TO RELATED APPLICATIONS

This application claims priority to European Application No. 14191070.3, having a filing date of Oct. 30, 2014, the entire contents of which are hereby incorporated by reference.

FIELD OF TECHNOLOGY

The following relates to the field of wind turbines, more particular, to the field of permanent magnet machines.

BACKGROUND

In most electrical alternating current machines, impedance is balanced. Thus, machine impedance is equal for different phases. However, machine impedance may be unbalanced in some special electrical machines.

For example, in order to achieve redundancy especially for off-shore wind turbines, generators with multiple three-phase winding are used for big wind turbines. Each set of three-phase winding may have a separately controlled frequency converter. With this kind of set up, a wind turbine can still produce electricity as long as at least one set of winding and its converter is in a good condition, even if all other windings and converters are broken. For a machine with multiple three-phase windings, mutual inductance between windings may change after one winding or its converter is broken. This causes an unbalanced impedance from the remaining windings. An unbalanced impedance may cause an unbalanced current or voltage at a machine stator and/or a converter. Due to unbalanced voltage and/or current, the stator power of the generator for example may have a harmonic at two times of the electrical frequency of the generator. As normally a bandwidth of a DC link voltage control loop is lower than this frequency, the balance of a grid power and the generator power cannot be achieved in such a situation. The harmonic in the stator power may cause a harmonic voltage at a same frequency at DC link capacitors of the frequency converter. The DC link voltage waveform in such a situation may comprise unwanted harmonics, which are not preferred, because a high harmonic at the DC link voltage may cause an over-modulation of the frequency converter and eventually trips the frequency converter.

Hence, there is a need for driving an electrical machine with an unbalanced impedance.

SUMMARY

According to a first aspect of embodiments of the invention there is provided a method for controlling an energy flow to a grid, from an electrical alternating current machine with unbalanced impedance, in particular an electrical alternating current generator of a wind turbine, the method comprising: obtaining a first power signal representing a first power command; obtaining a second power signal representing a second power command; obtaining a first current signal indicative for a feedback current from the electrical alternating current generator; obtaining a second current signal indicative for a feedback current from a grid converter; determining a first internal signal as a result from a first current reference calculation procedure making use of the first power signal, the first internal signal corresponding to a current command for the electrical alternating current machine; determining a second internal signal as a result from a second current reference calculation procedure making use of the second power signal, the second internal signal corresponding to a current command for the grid converter; determining a first output signal as a result from a first current controller procedure making use of the first current signal and the first internal signal, the first output signal representing a voltage command for a first axle of a machine synchronous rotating frame, the voltage command for the first axle being applicable for controlling the energy flow from the electrical alternating current machine in particular to the grid; and determining a second output signal as a result from a second current controller procedure making use of the second current signal, the second internal signal and a compensation calculation procedure, the second output signal representing a voltage command for a second axle of the grid synchronous rotating frame, the voltage command for the second axle being applicable for controlling the energy flow from the electrical alternating current machine in particular to the grid.

The advantage of this concept is that it may allow for a post-fault operation of a multi-winding alternating current generator/turbine.

This aspect of embodiments of the invention is based on the idea that by regulating the energy transfer from the alternating current machine to the grid, a multi-winding alternating current machine may be connected to the grid without stressing the grid in the case of an unbalanced impedance of the machine.

According to a first embodiment of the invention, obtaining the first power signal or obtaining the second power signal comprises: making use of a direct current link procedure.

According to a further embodiment of the invention, the method moreover comprises: obtaining a voltage signal indicative for a direct current link voltage; and obtaining a reference voltage signal indicative for a direct current link voltage reference. Therein, the direct current link procedure is making use of the voltage signal and the reference voltage signal.

According to a further embodiment of the invention the first internal signal is corresponding to the current command for the first axle of the synchronous rotating frame. The second internal signal is corresponding to the current command for the second axle of the synchronous rotating frame. The first current signal is indicative for the feedback current for the first axle of the synchronous rotating frame. And the second current signal is indicative for the feedback current for the second axle of the synchronous rotating frame.

According to a further embodiment of the invention, the first output signal is serving as a first input signal to a pulse-width-modulation procedure. And the second output signal is serving as a second input signal to the pulse-width-modulation procedure.

According to a further embodiment of the invention, if obtaining the first power signal comprises making use of the direct current link procedure, the method moreover comprises: obtaining the first power signal as a result from the direct current link procedure; obtaining a third power signal representing an operational condition of the electrical alternating current machine; determining a fourth power signal by a compensation power calculation procedure for calculating a power compensation value, wherein the compensation power calculation procedure corresponds to the compensation calculation procedure; and obtaining the second power signal by adding the third power signal to the fourth power signal.

According to a further embodiment of the invention, if obtaining the second power signal comprises making use of the direct current link procedure, the method moreover comprises: the first power signal corresponding to a third power signal representing an operational condition of the electrical alternating current machine; determining a fourth power signal by a compensation power calculation procedure for calculating a power compensation value, wherein the compensation power calculation procedure corresponds to the compensation calculation procedure; and obtaining the second power signal by adding the fourth power signal to a result from the direct current link procedure.

According to a further embodiment of the invention the compensation power calculation procedure comprises: obtaining a frequency signal indicative for a frequency of the electrical alternating current machine; determining a fifth power signal by a power calculation procedure for calculating a power; receiving a result from a filter procedure for filtering the fifth power signal by making use of the frequency signal and the fifth power signal; receiving the fourth power signal from a gain-phase-compensation procedure for compensating a gain and/or phase from the result from the filter procedure.

A filter procedure according to embodiments of the invention may comprise at least a filter or a filter algorithm, such as to filter a signal in a desired way. Preferably the filter procedure comprises a band-pass-filter or a band-pass-filter algorithm, in particular an adaptive bandpass-filter.

This embodiment has the advantage of filtering the signal from the electrical alternating current machine, such that only harmonic power at two times the electrical frequency may pass.

According to a further embodiment of the invention the compensation power calculation procedure comprises: receiving a result from a filter procedure for filtering the second voltage signal; receiving a result from a resonant regulator procedure for regulating the result from the filter procedure; receiving a result from a power calculation procedure for calculating a power from the result from the resonant regulator procedure; and receiving the fourth power signal from a gain-phase-compensation procedure for compensating a gain and/or phase of the result from the power calculation procedure.

This embodiment has the advantage of providing a compensation of the gain phase differences between the generator power and the grid power.

According to a further embodiment of the invention, if obtaining the first power signal comprises making use of the direct current link procedure, the method moreover comprises: obtaining the first power signal as a result from the direct current link procedure; the second power signal corresponding to a third power signal representing an operational condition of the electrical alternating current machine; receiving a further result from the second current reference calculation procedure making use of the second power signal; determining a third current signal by a compensation current calculation procedure, the third current signal representing a compensation current, wherein the compensation current calculation procedure corresponds to the compensation calculation procedure; and determining a third internal signal by adding the third current signal to the further result from the second current reference calculation procedure; and the second current controller procedure moreover making use of the third internal signal.

According to a further embodiment of the invention, if obtaining the second power signal comprises making use of the direct current link procedure, the method moreover comprises: the first power signal corresponding to a third power signal representing an operational condition of the electrical alternating current machine; obtaining the second power signal as a result from the direct current link procedure; receiving a further result from the second current reference calculation procedure making use of the second power signal; determining a third current signal by a compensation current calculation procedure, the third current signal representing a compensation current, wherein the compensation current calculation procedure corresponds to the compensation calculation procedure; and determining a third internal signal by adding the third current signal to the further result from the second current reference calculation procedure; and the second current controller procedure moreover making use of the third internal signal.

According to a further embodiment of the invention the compensation current calculation procedure comprises: obtaining a frequency signal indicative for a frequency of the electrical alternating current machine; determining a fifth power signal by a power calculation procedure for calculating a power; receiving a result from a filter procedure for filtering the fifth power signal by making use of the frequency signal and the fifth power signal; receiving a result from a current calculation procedure for calculating a current from the result from the filter procedure; and receiving the third current signal from a gain-phase-compensation procedure for compensating a gain and/or phase from the result from the current calculation procedure.

According to a further embodiment of the invention the compensation current calculation procedure comprises: receiving a result from a filter procedure for filtering the second voltage signal; receiving a result from a resonant regulator procedure for regulating the result from the filter procedure; and receiving the third current signal from a gain-phase-compensation procedure for compensating a gain and/or phase from the result from the resonant regulator procedure.

According to a second aspect of embodiments of the invention there is provided an arrangement for controlling the operation of an electrical alternating current machine with unbalanced impedance, in particular an electrical alternating current generator of a wind turbine, the arrangement being configured for performing a method according to any one of the preceding embodiments of the first aspect of the embodiments of the invention.

The advantage of this concept is that it may allow for a post-fault operation of a multi-winding alternating current generator/turbine.

This aspect of embodiments of the invention is based on the idea that by providing an energy regulation circuit to the machine, the energy transfer from the alternating current machine to the grid may be provided without stressing the grid in the case of an unbalanced impedance of the machine.

According to a further embodiment of the invention the arrangement comprises a compensation power calculation unit for calculating a compensation power command of a grid converter based on at least one value, wherein the value is chosen from a value group. The values of the value group are respectively representing a DC link voltage, a generator power, a generator torque, a generator current or a generator voltage. The compensation power command is a harmonic with a frequency proportional to an electrical frequency of the electrical alternating current generator. The arrangement moreover comprises a grid power reference and/or a grid power command from either a turbine controller or a DC link voltage controller; and a summation element configured for adding the compensation power command to the grid power reference and/or the grid power command, in order to achieve a grid power command control signal. Moreover, the arrangement comprises a power controller, the power controller being adapted for allowing a grid power to follow the grid power command signal.

According to a further embodiment of the invention the arrangement comprises a compensation current calculation unit for calculating a compensation current command of the grid converter based on at least a value, wherein the value is chosen from the value group. The compensation current is a harmonic with a frequency proportional to the electrical frequency of the generator. The arrangement moreover comprises a grid active current reference and/or a grid active current command. Therein, the grid active current reference and/or the grid active current command each are received from the DC link voltage controller and/or a calculation unit. The arrangement moreover comprises a summation element configured for adding a current command in order to achieve a grid active current command control signal. Moreover, the arrangement comprises a current controller, the current controller being adapted for allowing a current to follow the grid active current command control signal.

The calculation unit according to embodiments of the invention may be for example a Grid fault ride-through.

According to a third aspect of embodiments of the invention there is provided a computer program for processing a physical object according to any one of the preceding embodiments of the second aspect of embodiments of the invention, the computer program, when being executed by a data processor, is adapted for controlling and/or for carrying out the method as set forth in any one of the preceding embodiments of the first aspect of embodiments of the invention.

This aspect of embodiments of the invention is based on the idea that the control method for the energy transfer from the machine to the grid may be provided in a very flexible way.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of embodiments of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION

Some of the embodiments will be described in detail, with reference to the following figures, wherein like designations denote like members, wherein.

DETAILED DESCRIPTION

Figure 1:
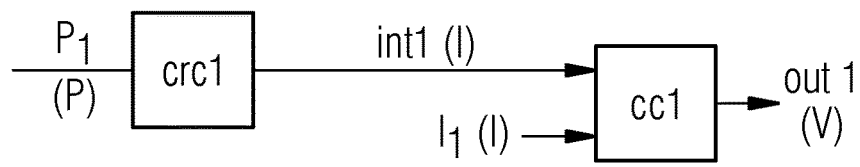
FIG. 1 shows a schematically drawing of a proposed method according to an exemplary embodiment of the invention.
Figure 1:
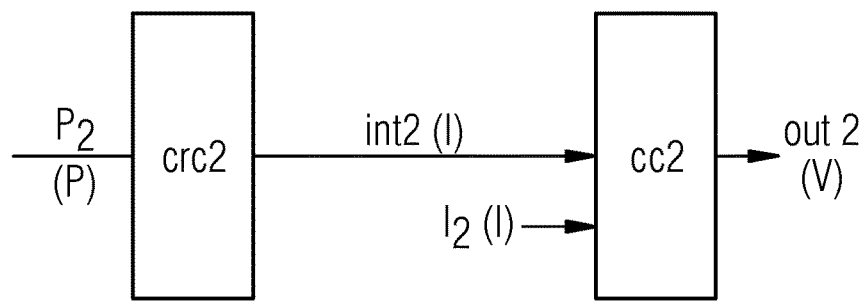

The illustration in the drawing is schematically. It is noted that in different figures, similar or identical elements or features are provided with the same reference signs or with reference signs, which are different from the corresponding reference signs only within the first digit. In order to avoid unnecessary repetitions elements or features which have already been elucidated with respect to a previously described embodiment are not elucidated again at a later position of the description.

FIG. 1 shows a schematically drawing of a proposed method according to an exemplary embodiment of the invention.

In FIG. 1 is shown a method for controlling an energy flow to a grid, from an electrical alternating current machine with unbalanced impedance, in particular an electrical alternating current generator of a wind turbine, the method comprising: obtaining a first power signal P1 representing a first power command; obtaining a second power signal P2 representing a second power command; obtaining a first current signal I1 indicative for a feedback current from the electrical alternating current generator; obtaining a second current signal I2 indicative for a feedback current from a grid converter; determining a first internal signal int1 as a result from a first current reference calculation procedure crc1 making use of the first power signal P1, the first internal signal int1 corresponding to a current command for the electrical alternating current machine; determining a second internal signal int2 as a result from a second current reference calculation procedure crc2 making use of the second power signal P2, the second internal signal int2 corresponding to a current command for the grid converter; determining a first output signal OUT1 as a result from a first current controller procedure cc1 making use of the first current signal I1 and the first internal signal int1, the first output signal OUT1 representing a voltage command for a first axle of a machine synchronous rotating frame, the voltage command for the first axle being applicable for controlling the energy flow from the electrical alternating current machine to the grid; and determining a second output signal OUT2 as a result from a second current controller procedure cc2 making use of the second current signal I2, the second internal signal int2 and a compensation calculation procedure, the second output signal OUT2 representing a voltage command for a second axle of the grid synchronous rotating frame, the voltage command for the second axle being applicable for controlling the energy flow from the electrical alternating current machine to the grid.

FIGS. 2, 3, 4 and 5 each show another embodiment of the provided method shown in FIG. 1 according to exemplary embodiments of the invention.

Therein, obtaining the first power signal P1 or obtaining the second power signal P2 comprises: making use of a direct current link procedure dc1.

Moreover, the illustrated methods of FIGS. 2 to 5 each comprise: obtaining a voltage signal V1 indicative for a direct current link voltage; obtaining a reference voltage signal V2 indicative for a direct current link voltage reference; and the direct current link procedure dc1 making use of the voltage signal V1 and the reference voltage signal V2.

Therein, the first internal signal int1 is corresponding to the current command for the first axle of the synchronous rotating frame. The second internal signal int2 is corresponding to the current command for the second axle of the synchronous rotating frame. The first current signal I1 is indicative for the feedback current for the first axle of the synchronous rotating frame. And the second current signal I2 is indicative for the feedback current for the second axle of the synchronous rotating frame.

Moreover, the first output signal OUT1 is serving as a first input signal to a pulse-width-modulation procedure, and the second output signal OUT2 is serving as a second input signal to the pulse-width-modulation procedure.

Figure 2:
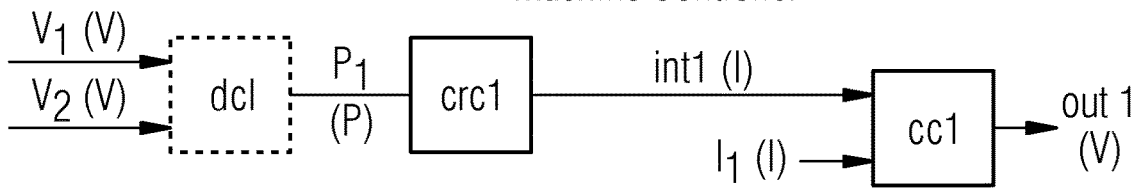
FIG. 2 shows a schematically drawing of a proposed method according to another exemplary embodiment of the invention.
Figure 2:
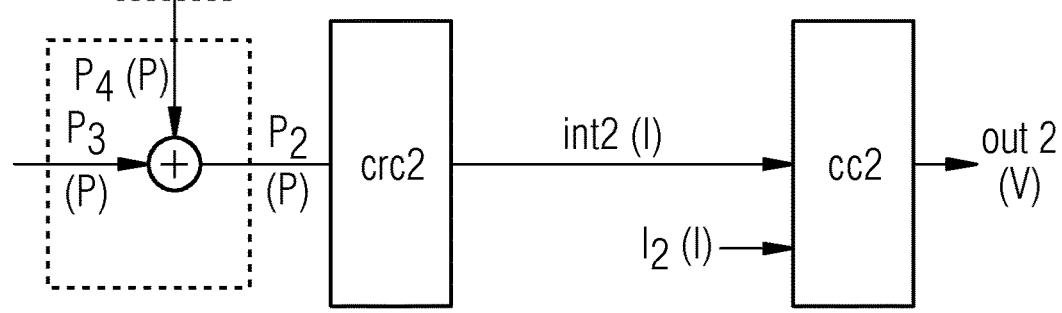

FIG. 2 shows a schematically drawing of a proposed method according to another exemplary embodiment of the invention.

In FIG. 2, if obtaining the first power signal P1 comprises making use of the direct current link procedure dc1, the method moreover comprises: obtaining the first power signal P1 as a result from the direct current link procedure dc1; obtaining a third power signal P3 representing an operational condition of the electrical alternating current machine; determining a fourth power signal P4 by a compensation power calculation procedure cpc for calculating a power compensation value; and obtaining the second power signal P2 by adding the third power signal P3 to the fourth power signal P4.

Figure 3:
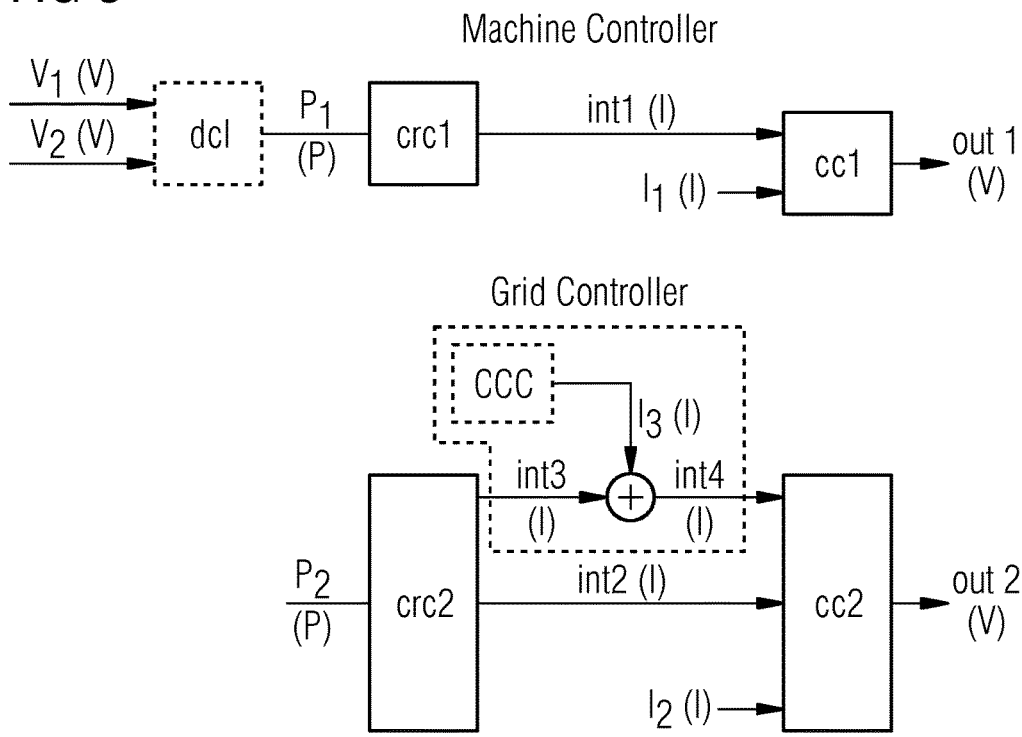
FIG. 3 shows a schematically drawing of a proposed method according to another exemplary embodiment of the invention.

FIG. 3 shows a schematically drawing of a proposed method according to another exemplary embodiment of the invention.

In FIG. 3, if obtaining the first power signal P1 comprises making use of the direct current link procedure dc1, the method moreover comprises: obtaining the first power signal P1 as a result from the direct current link procedure dc1, the second power signal P2 corresponding to a third power signal P3 representing an operational condition of the electrical alternating current machine; receiving a further result from the second current reference calculation procedure crc2 making use of the second power signal P2; determining a third current signal I3 by a compensation current calculation procedure ccc, the third current signal I3 representing a compensation current; and determining a third internal signal int3 by adding the third current signal I3 to the further result from the second current reference calculation procedure crc2. Therein, the second current controller procedure cc2 moreover is making use of the third internal signal int3.

Figure 4:
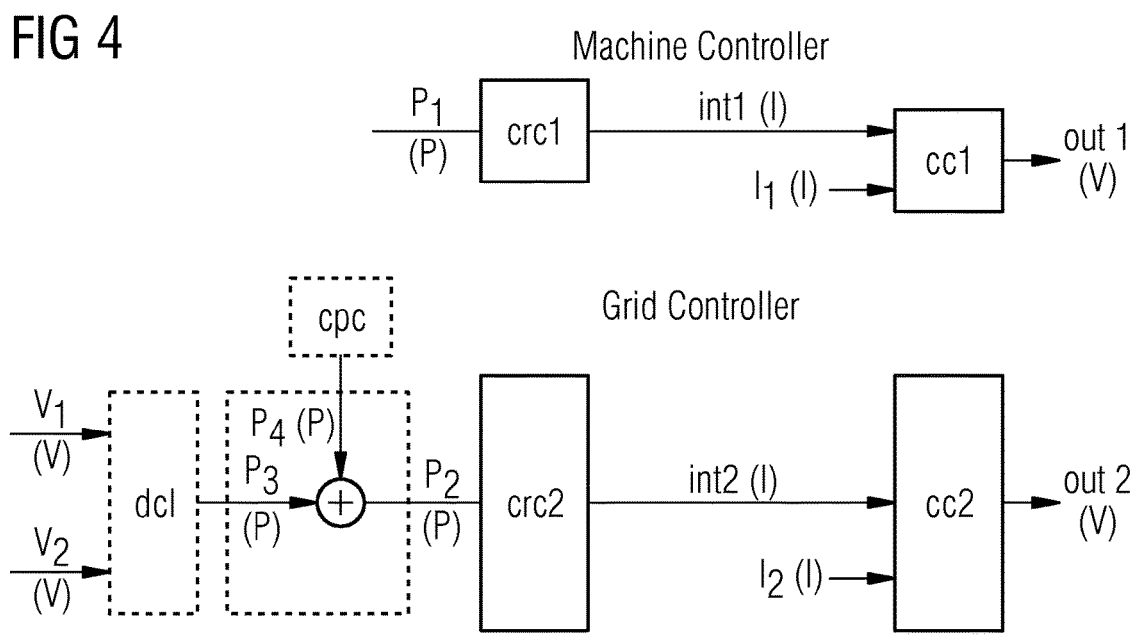
FIG. 4 shows a schematically drawing of a proposed method according to another exemplary embodiment of the invention.

FIG. 4 shows a schematically drawing of a proposed method according to another exemplary embodiment of the invention.

In FIG. 4, if obtaining the second power signal P2 comprises making use of the direct current link procedure dc1, the method moreover comprises: the first power signal P1 corresponding to a third power signal P3 representing an operational condition of the electrical alternating current machine; determining a fourth power signal P4 by a compensation power calculation procedure cpc for calculating a power compensation value; and obtaining the second power signal P2 by adding the fourth power signal P4 to a result from the direct current link procedure dc1.

Figure 5:
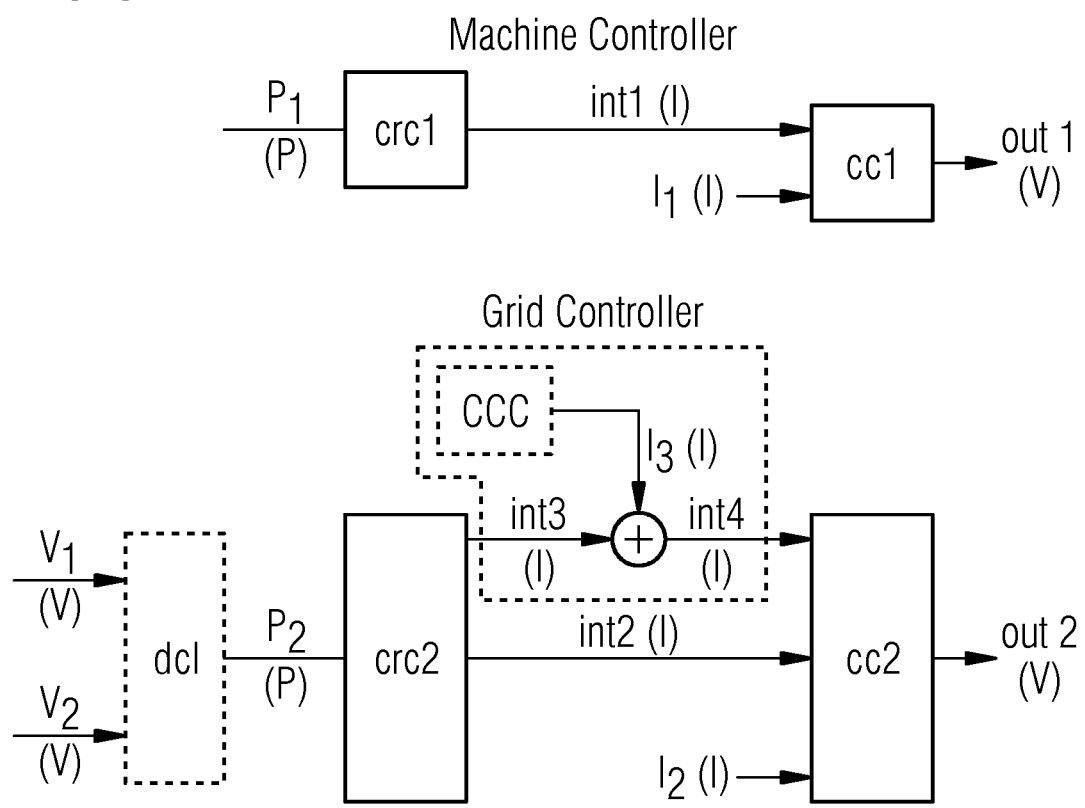
FIG. 5 shows a schematically drawing of a proposed method according to another exemplary embodiment of the invention.

FIG. 5 shows a schematically drawing of a proposed method according to another exemplary embodiment of the invention.

In FIG. 5, if obtaining the second power signal P2 comprises making use of the direct current link procedure dc1, the method moreover comprises: the first power signal P1 corresponding to a third power signal P3 representing an operational condition of the electrical alternating current machine; obtaining the second power signal P2 as a result from the direct current link procedure dc1; receiving a further result from the second current reference calculation procedure crc2 making use of the second power signal P2; determining a third current signal I3 by a compensation current calculation procedure ccc, third current signal I3 representing a compensation current; and determining a third internal signal int3 by adding the third current signal I3 to the further result from the second current reference calculation procedure crc2. Therein, the second current controller procedure cc2 moreover is making use of the third internal signal int3.

Figure 6:
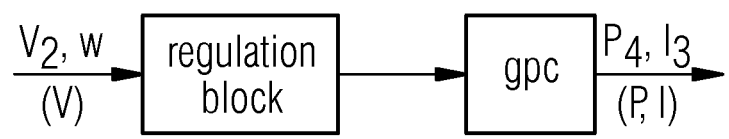
FIG. 6 shows a schematically drawing of a proposed compensation power/current calculation procedure according to an exemplary embodiment of the invention.

FIG. 6 shows a schematically drawing of a proposed compensation power/current calculation procedure according to an exemplary embodiment of the invention.

In FIG. 6 the compensation power calculation procedure cpc comprises: obtaining a frequency signal w indicative for a frequency of the electrical alternating current machine, and/or obtaining the second voltage signal V2; and receiving the fourth power signal P4 and/or the third current signal I3 from a gain-phase-compensation procedure gpc for compensating a gain and/or phase from the result from a regulation block procedure.

Figure 7:
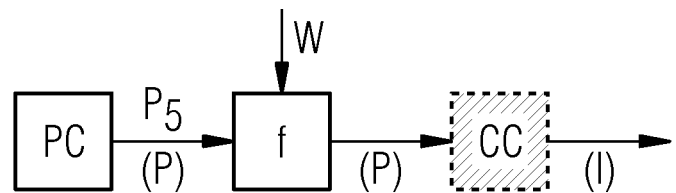
FIG. 7 shows a schematically drawing of a proposed regulation block procedure of the compensation power/current calculation procedure of FIG. 6 according to an exemplary embodiment of the invention.
Figure 8:
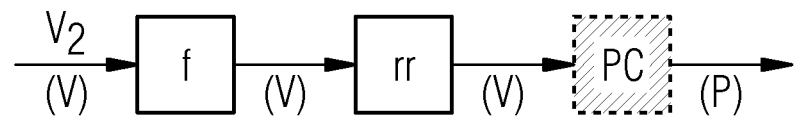
FIG. 8 shows a schematically drawing of a proposed regulation block procedure of the compensation power/current calculation procedure of FIG. 6 according to another exemplary embodiment of the invention.

FIGS. 7 and 8 each show another embodiment of the provided method shown in FIG. 6 according to exemplary embodiments of the invention.

FIG. 7 shows a schematically drawing of a proposed regulation block procedure of the compensation power/current calculation procedure of FIG. 6 according to an exemplary embodiment of the invention.

In FIG. 7 the compensation power/current calculation procedure cpc of FIG. 6 comprises: obtaining a frequency signal w indicative for a frequency of the electrical alternating current machine; determining a fifth power signal P5 by a power calculation procedure pc for calculating a power; and receiving a result from a filter procedure f for filtering the fifth power signal p5 by making use of the frequency signal w and the fifth power signal P5.

If taking into account the shaded block cc in FIG. 7, FIG. 7 moreover shows receiving a result from a current calculation procedure cc for calculating a current from the result from the filter procedure f.

FIG. 8 shows a schematically drawing of a proposed regulation block procedure of the compensation power/current calculation procedure of FIG. 6 according to another exemplary embodiment of the invention.

In FIG. 8 the compensation power/current calculation procedure cpc of FIG. 6 comprises: receiving a result from a filter procedure f for filtering the second voltage signal V2; and receiving a result from a resonant regulator procedure rr for regulating the result from the filter procedure f.

If taking into account the shaded block pc in FIG. 8, FIG. 8 moreover shows receiving a result from a power calculation procedure pc for calculating a power from the result from the resonant regulator procedure rr.

It should be noted that the term "comprising" does not exclude other elements or steps and the use of articles "a" or "an" does not exclude a plurality. Also elements described in association with different embodiments may be combined. It should also be noted that reference signs in the claims should not be construed as limiting the scope of the claims.

It should be noted that the term "attaching" may comprise bolting, riveting, welding or any other bonding of two materials, depending of the use of the materials and/or parts attached to each other. Where possible and useful, welding, bolting or riveting may be substituted by each other.

It is noted that it may also be possible in further refinements of embodiments of the invention to combine features from different illustrative embodiments described herein. It should also be noted that reference signs in the claims should not be construed as limiting the scope of the claims.

In order to recapitulate the above described embodiments of the present invention one can state:

Embodiments of the present invention may allow for a post-fault operation of a multi-winding generator/turbine, may minimize the DC link voltage oscillation due to unbalanced machine impedance, and may reduce converter trips due to over-modulation. Moreover, the embodiments of the present invention may cause nearly no additional costs, and may cause no major change requirements for the hardware of available products in the market.

Therefore, embodiments of the present invention provide a solution for the issue of power unbalance at DC link capacitors. The method can be used for both machines with balanced impedance and machines with unbalanced impedance. The method can be used mainly in variable speed wind turbine. Nevertheless, it may also be possible to use the principles of the provided embodiments of the invention for other applications like for motor drives and electrical cars.

The invention claimed is:

1. A method for controlling energy flow to a grid, from an electrical alternating current generator of a wind turbine having an unbalanced impedance, the method comprising:
   providing an electrical alternating current generator, wherein the electrical alternating current generator has an unbalanced impedance,
   obtaining a voltage signal indicative of a direct current link voltage,
   obtaining a reference voltage signal indicative of a direct current link voltage reference,
   obtaining a first power signal representing a first power command, wherein the first power command is a power command for a controller of the electrical alternating current generator having the unbalanced impedance, wherein the first power signal is based on the voltage signal and the reference voltage signal,
   obtaining a second power signal representing a second power command, wherein the second power command is a power command for a controller of the grid,
   obtaining a first current signal indicative of a feedback current from the electrical alternating current generator having the unbalanced impedance,
   obtaining a second current signal indicative of a feedback current from a grid converter,
   determining a first internal signal based on the first power signal, the first internal signal corresponding to a current command for the electrical alternating current machine having the unbalanced impedance,
   determining a second internal signal based on the second power signal, the second internal signal corresponding to a current command for the grid converter,
   determining a first output signal based on the first current signal and the first internal signal, the first output signal representing a voltage command for a first axle of a machine synchronous rotating frame, the voltage command for the first axle being applicable for controlling the energy flow from the electrical alternating current machine having the unbalanced impedance,
   determining a second output signal based on the second current signal and the second internal signal the second output signal representing a voltage command for a second axle of the grid synchronous rotating frame, the voltage command for the second axle being applicable for controlling the energy flow from the electrical alternating current machine having the unbalanced impedance.

2. The method as set forth in claim 1, wherein the first internal signal corresponds to the current command for the first axle of the synchronous rotating frame,
   the second internal signal corresponds to the current command for the second axle of the synchronous rotating frame,
   the first current signal is indicative of the feedback current for the first axle of the synchronous rotating frame, and wherein
   the second current signal is indicative of the feedback current for the second axle of the synchronous rotating frame.

3. The method as set forth in claim 1, wherein the first output signal is serving as a first input signal for pulse-width-modulation, and wherein the second output signal is serving as a second input signal for pulse-width-modulation.

4. The method as set forth in claim 1, wherein the method comprises:
   obtaining a third power signal representing an operational condition of the electrical alternating current machine,
   determining a fourth power signal based on a compensation calculation, and
   obtaining the second power signal by adding the third power signal to the fourth power signal.

5. The method as set forth in claim 1, wherein the second power signal is based on a second voltage signal and a second reference voltage signal, and
   the method further comprises:
   determining a fourth power signal based on a compensation calculation, and
   wherein the second power signal is also based on the fourth power signal.

6. The method as set forth in claim 4, wherein the compensation calculation comprises:
   obtaining a frequency signal indicative of a frequency of the electrical alternating current machine,
   determining a fifth power signal based on a compensation,
   filtering the fifth power signal by making use of the frequency signal and the fifth power signal,
   receiving the fourth power signal from a gain-phase-compensation procedure for compensating a gain and/or phase from the result of the filtering, wherein the gain-phase compensation procedure includes providing a compensation of gain phase differences between generator power and grid power.

7. The method as set forth in claim 4, wherein the compensation calculation comprises:
filtering the second voltage signal,
regulating the result from the filtering
calculating a power from the result of the regulating, and
receiving the fourth power signal based on compensating a gain and/or phase of the result from the calculating.

8. An arrangement for controlling an energy flow to a grid, from an electrical alternating current generator of a wind turbine, the arrangement being configured for performing a method according to claim 1.

9. A computer program for processing an electrical alternating current generator of a wind turbine, the computer program comprising a computer readable hardware storage device having computer readable program code stored therein, said program code executable by a processor of a computer system, wherein the computer program when being executed by a data processor, is adapted for controlling and/or for carrying out the method as set forth in claim 1.

* * * * *